3,246,038
PROCESS FOR THE PRODUCTION OF 4-[2',6',6'-TRIMETHYLCYCLOHEXEN - (1') - YL] - 2 - METHYLBUTEN-(3)-Al-(1)
Karl Eiter and Hermann Oediger, Cologne-Stammheim, Rudolf Lorenz, Wuppertal-Elberfeld, and Eberhard Stein, Leverkusen, Germany, assignors to Farbenfabriken Bayer Aktiengesellschaft, Leverkusen, Germany, a corporation of Germany
No Drawing. Filed May 4, 1962, Ser. No. 192,360
Claims priority, application Germany, May 5, 1961, F 33,855
10 Claims. (Cl. 260—598)

This invention relates to the preparation of 4-[2',6',6'-trimethylcyclohexen-(1')-yl] - 2 - methylbuten-(3)-al-(1). More particularly, the present invention relates to an improved procedure for producing 4-[2',6',6'-trimethylcyclohexen-(1')-yl]-2-methylbuten-(3)-al-(1) of significantly greater purity and in markedly greater yields than known heretofore.

One method for securing the desired aldehyde, suggested heretofore, may be illustrated by the following reaction sequence:

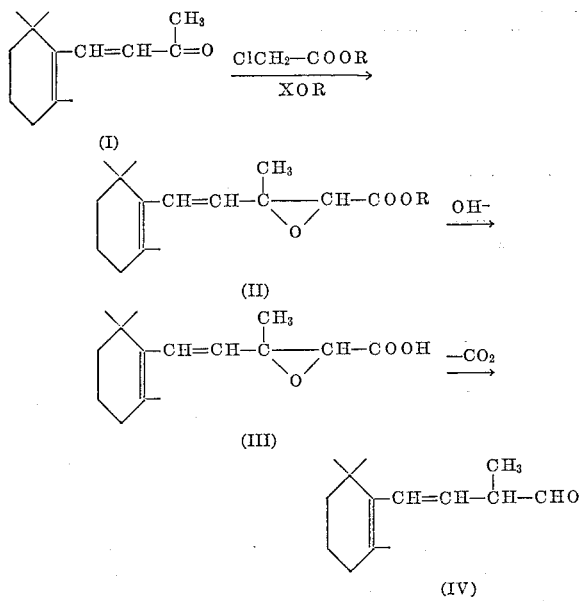

wherein R is a lower alkyl radical and X is lithium, sodium or potassium.

The synthesis of the aldehyde (IV) in the aforesaid sequence is seen to take place in three separate steps. Thus, the oxido ester (II) is isolated and purified by vacuum distillation. The corresponding oxido acid (III) obtained by saponification of the ester (II) is also separated and, in the last step, converted presumably into the desired $C_{14}$-aldehyde (IV) by decarboxylation at an elevated temperature (i.e., at least the boiling temperature of pyridine). Reference is made with regard to the aforesaid process of the prior art to Ishikawa, Chem. Zentralblatt, vol. II, p. 3452 (1937); N. Milas et al., J. Am. Chem. Soc., vol. 70, p. 1584 (1948); U.S. Patents 2,369,156; 2,369,160 until 2,369,167.

It is noted that in the aforesaid reaction sequence, the sensitive and desired intermediates are substantially destroyed or unattained. Thus, the method of isolation proposed and described by the discoverers (i.e., Milas et al. and Ishikawa et al.) of the aforesaid initially described reaction sequence, recites the addition of water and acetic acid or tartaric acid to the primary condensation product, the oxido ester (II). This addition, it has now been established, leads, in fact, to the complete opening of the epoxy ring Thus, in attempting to isolate the oxido ester (II), hydroxy containing ester mixtures were actually formed, containing in preponderant amounts, the retro-α-hydroxycarboxylic acid ester of the formula:

(V) 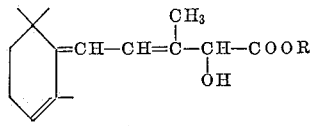

wherein R is a lower alkyl radical corresponding to that of the chloroacetic acid alkyl ester of the initial condensation reaction as described above. (See German Patent 1,080,-550.) By saponification and decarboxylation in the manner of Ishikawa et al. and Milas et al., the hydroxylated mixtures of reactants again yielded mixtures which, in turn, contained the product aldehyde, if at all, only in a very low state of purity.

It has been maintained by other and later workers in the field who employed the aforesaid process that the product secured by the aforesaid sequence is, in fact, not the product aldehyde (IV) but rather an isomer thereof of the formula:

(VI) 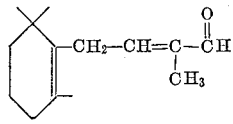

As will be apparent the double bond of the side chain in the product aldehyde (VI) is present in the α,β-position relative to the carbonyl group of the aldehyde. Reference is thus made, with regard to the description of the aldehyde (VI) to Heilbron et al., J. Chem. Soc. (London), p. 727 (1942); p. 500 (1946); and p. 1516 (1949); H. H. Inhoffen et al., Liebigs Annalen, vol. 561, page 26 (1949); vol. 570, p. 73 (1950); G. I. Samokhvalov et al., Journ. Gen. Chem. USSR, vol. 26, p. 3457 (1956).

The production of this latter compound, the β-$C_{14}$-aldehyde (VI) is also described by O. Isler in German Patent 842,190.

In the process of this reference, the condensation of β-ionone (I) is effected by the method of Darzens employing a chloroacetic acid alkyl (i.e., ethyl) ester in the presence additionally of an alkali metal alcoholate; the reaction taking place at a reduced temperature with saponification subsequently with an alkaline agent of the primary condensation product without isolation thereof from the reaction mixture; and simultaneous decarboxylation to form, according to the description, β-$C_{14}$-aldehyde (VI). The latter product is, however, isolated from the reaction mixture by the addition of water.

Accordingly, it has now been discovered that the aldehyde, 4-[2',6',6' - trimethylcyclohexen - (1')-yl]-2-methylbuten-(3)-al-(1), (IV), can be produced in significantly high yields of substantial purity by the process that comprises reacting β-ionone with a chloroacetic acid alkyl ester, wherein the alkyl moiety is preferably a lower alkyl radical, by Dargens' method of condensation, at a reduced temperature in the presence of a nucleophilic agent, such as an alkali metal alcoholate, alkaline earth metal alcoholate, alkali metal amide, alkali metal hydride, or amalgamated magnesium, and in the presence, optionally, of an inert organic solvent. The resulting condensation product is treated in situ with an alkaline agent to effect saponification thereof and is also reacted with a substantially anhydrous acid reactant and sequentially, thereafter with water or an aqueous solution of an acidic agent, and the desired aldehyde (IV) isolated from the reaction product mixture.

The instant process thus differs from the reaction sequence described initially above, that of Ishikawa et al. and Milas et al., principally, in that the resulting very sensitive intermediate products are neither isolated nor destroyed; the reaction is carried out at low temperatures as "a one vessel process" and the product aldehyde (IV) is not only obtained, but, as indicated above, in high yields of substantial purity.

In contradistinction to the process of Isler et al., on the other hand, applicants obtain the desired aldehyde (IV) by a method wherein the saponification is carried out by adding an alkaline agent and the following decarboxylation by adding an acid agent, preferably anhydrous; and the aldehyde (IV) sequentially isolated from the reaction mixture to which water or an aqueous acid agent has been added after introduction therein of the anhydrous acid component.

The result obtained according to the process of the invention is particularly surprising in view of the teaching of Heilbron et al., Inhoffen et al., Samokhvalov et al. alluded to above who have even recently rejected the $C_{14}$-aldehyde (IV) as non-existent.

The following table indicates clearly the distinctions in properties of the desired product aldehyde, 4-[2',6',6'-trimethylcyclohexen-(1')-yl]-2 - methylbuten - (3) - al-(1), (IV), from the isomeric aldehyde (VI).

of 1.2 to 2 mols thereof to each mol of β-ionone and preferably in a ratio of 1.5 to 1 respectively. The alkali metal hydroxide is incorporated, for use, preferably in a 5 percent to 20 percent (preferably 15 percent) alcoholic solution, most desirably an absolute lower aliphatic alcohol, such as, for example, methanol or ethanol. The reaction temperature depends on the concentration of the saponification agent and lies preferably within the range of $-10°$ C. to $20°$ C. The period of saponification is from one hour to two hours.

The saponification product is then treated, preferably, as indicated above, without isolation thereof from the reaction mixture, with an excess of an acid reagent, preferably, anhydrous, and at least concentrated; for example, a lower fatty acid, containing from 1 to 6 carbon atoms, such as, formic acid, acetic acid or propionic acid, in such a manner that the temperature of the reaction mixture is maintained at not in excess of $20°$ C. and normally not below $-30°$ C. The reaction solution is thereafter mixed with from 0.5 liter to 1.0 liter of water or a like volume of a dilute aqueous organic acid or inorganic acid solution, per mol of β-ionone reactant initially introduced, and maintained at a temperature of between $0°$ C. and $30°$ C., and preferably $20°$ C. Illustrative of the organic acids which may be employed in the aforesaid aqueous

TABLE

| | B.P., °C./mm. Hg | $n_D^{20}$ | UV, $\lambda_{max}$ in m$\mu$ ($\epsilon$) | IR, frequency in cm.$^{-1}$ | | |
|---|---|---|---|---|---|---|
| | | | | Aldehyde $\diagdown C=O \diagup$ | Conjugated $\diagdown C=C \diagup$ | Trans $\diagdown_H C=C \diagup^H$ |
| $C_{14}$-aldehyde (IV) | 82-84/0.07 | 1.4916 | 232 (5400) | 1729 | ------------ | 973 |
| $C_{14}$-aldehyde (VI) | 78-80/0.03 | 1.5112 | 231 (17800) | 1695 | 1640 | ------------ |

| Nucleus resonance spectra | | | | | |
|---|---|---|---|---|---|
| Aldehyde proton signal | | Proton number of double bonds | Semicarbazone M.P. in °C. | Phenylsemi-carbazone M.P. in °C. | Thiosemi-carbazone M.P. in °C. |
| (IV) split | | 2 | 122-124 | 120-121 | 112-113 |
| (VI) simple | | 1 | 156-157 | 181-182 | 195-196 |

For the production of the glycide ester (II), 1 mol of β-ionone (I) is condensed with 1.1–1.5, and preferably 1.35, mols of a lower alkyl ester of chloroacetic acid, for example, chloroacetic acid methyl ester or chloroacetic acid ethyl ester, in the presence of 1.2–1.7, and preferably 1.5, mols of an alcohol-free alkali metal alcoholate containing, preferably, from 1 to 6 carbon atoms, such as sodium methylate, sodium ethylate or potassium tert.-butylate, or of an alkaline earth metal alcoholate containing, preferably, from 1 to 6 carbon atoms, amalgamated magnesium, or an alkali metal amide or alkali metal hydride, at a temperature between $-20°$ C. to $10°$ C., and preferably between $-10°$ C. and $0°$ C., in the presence of a liquid, inert organic diluent, such as pyridine, tetrahydrofuran, toluene or the like. Preferably, there are used about 100 parts to 200 parts by volume of diluent per mol of β-ionone (I) employed. The time of the reaction depends on the condensation temperature and is from 2 to 4 hours. It is considered desirable that the aforesaid reaction proceed in the presence of an antioxidant, such as, for example, phenothiazine or hydroquinone, and with the exclusion of atmospheric oxygen and moisture.

The glycide ester (II) thus obtained is not isolated but is, rather, saponified in situ with an alkaline agent. The alkaline reagent employed is desirably an alkali metal hydroxide, for example, potassium hydroxide or sodium hydroxide. This saponification reagent is used in a ratio solution are dicarboxylic acids, and mono- and di-hydroxy substituted dicarboxylic acids, and preferably those of 1 to 6 carbon atoms, such as oxalic acid and tartaric acid. Illustrative of the inorganic acids are sulfuric acid, phosphoric acid, and the like. These acids are employed, if desired, in the dilute aqueous form, e.g., up to 20 percent of acid by volume, to produce a stronger degree of acidity in the aqueous phase.

The aqueous or acidic aqueous solution is added to the reaction mixture at a temperature of $0°$ C. to $30°$ C.; the preferred temperature being about $20°$ C.

The isolation of the β-$C_{14}$-aldehyde (IV) takes place according to known methods, and is carried out preferably in an inert organic medium, such as an ether, e.g. diethyl ether or petroleum ether, wherein the desired aldehyde (IV) is dissolved. After purification of the organic phase for the removal of excess acid, there is obtained the product, 4-[2',6',6'-trimethylcyclohexen-(1')-yl]-2-methylbuten-(3)-al-(1), (IV), as a residue remaining after evaporation of the solvent. This product (IV) is then subjected to high vacuum distillation for purification.

The product aldehyde (IV) is a valuable intermediate for the production of Vitamin A in accordance with U.S. Patent 2,567,572.

The following examples are further illustrative of the invention.

Example 1

Into a mixture of 19.2 parts by weight of β-ionone, 16.6 parts by weight of chloroacetic acid ethyl ester, 0.1 part by weight of phenothiazine and 10 parts by volume of absolute pyridine, are introduced at −10° C. to −15° C., with the exclusion of atmospheric oxygen and moisture, 8.1 parts by weight of alcohol-free sodium methylate within a period of ten minutes. The reaction mixture is warmed to −5° C.; this temperature being maintained for four hours. At the end of this period, 40.5 parts by volume of a 15 percent methanolic sodium hydroxide solution, produced by dissolving sodium hydroxide in absolute methanol, are added and the reaction mixture left for 30 minutes at +10° C. At the expiration of this period, the reaction mixture is then cooled to about −30° C., mixed with 100 parts by weight of glacial acetic acid and subsequently, after the addition of 100 parts by volume of water, left to stand for one hour.

The water-insoluble components are then extracted with low boiling petroleum ether, the petroleum ether extract washed neutral with water and dried over sodium sulfate. After evaporation of the ether in a vacuum, the remaining crude aldehyde is purified by high vacuum distillation.

There are obtained 13.6 parts by weight (66 percent of the theoretical of 4-(2′,6′,6′-trimethylcyclohexen-(1′)-yl)-2-methylbuten-(3)-al-(1) as an almost colorless liquid; B.P. 82° C.–84° C./0.07 mm. Hg; $n_D^{20}$: 1.4916; $\lambda_{max}$=232 mμ ($\epsilon$=5400).

*Analysis.*—$C_{14}H_{22}O$ (M.W.=206.3). Calc.: C=81.50%, H=10.75%. Found: C=81.16%, H=10.71%.

The infra-red absorption spectrum shows at 1729 cm.$^{-1}$ the absorption characteristics for the carbonyl oscillation of α,β-saturated aldehydes, and at 973 cm.$^{-1}$ for the CH-oscillation of symmetrically disubstituted trans-CH=CH- ethylenes.

The nucleus resonance spectrum shows a resonance signal of the aldehyde proton split into two lines by the neighboring proton; as well as two signals which possess the characteristic chemical shift for protons on double bonds. Semicarbazone: M.P.=122° C.–124° C.; $\lambda_{max}$±230 mμ ($\epsilon$=17.500).

*Analysis.*—$C_{15}H_{25}N_3O$ (M.W.=263.4). Calc.: C=68.40%, H=9.57%, N=15.96%. Found C=68.63%, H=9.73%, N=15.94%.

Phenylsemicarbazone: M.P.=120° C.–121° C.; $\lambda_{max}$=251 mμ ($\epsilon$=24.500).

*Analysis.*—$C_{21}H_{29}N_3O$ (M.W.=339.5). Calc.: C=74.29%, H=8.61%, N=12.38%. Found: C=73.98%, H=8.79%, N=12.45%.

Thiosemicarbazone: M.P.=112° C.–113° C.; $\lambda_{max}$=273 mμ ($\epsilon$=27.000).

*Analysis.*—$C_{15}H_{25}N_3S$ (M.W.=279.4). Calc.: C=64.48%, H=9.02%, N=15.04%. Found: C=64.40%, H=9.23%, N=15.09%.

Example 2

Into a mixture of 19.2 parts by weight of β-ionone, 14.7 parts by weight of chloroacetic acid methyl ester, 0.1 part by weight of hydroquinone and 20 parts by volume of anhydrous tetrahydrofuran, there is introduced at −10° C. to −15° C., with the exclusion of atmospheric oxygen and moisture, 10.2 parts by weight of alcohol-free sodium ethylene within a period of ten minutes. The reaction mixture is maintained at 0° C. for one hour, 56 parts by volume of a 15 percent methanolic potassium hydroxide solution produced by dissolving potassium hydroxide in absolute methanol are subsequently allowed to run in and the reaction mixture is maintained at 0° C. for one hour.

The reaction mixture is then cooled to about −30° C., mixed with 100 parts by volume of acetic acid and subsequently, after the addition of 100 parts by volume of 10 percent aqueous tartaric acid, left to stand at +20° C. for one hour.

For the isolation of the aldehyde, the procedure is carried out as in Example 1; the petroleum ether being replaced by diethyl ether. 12.5 parts by weight (61 percent of the theoretical) of an almost colorless liquid with the same chemical and physical properties as the substance described in Example 1 are obtained. The product is 4-[2′,6′,6′-trimethylcyclohexen-(1′)-yl]-2-methylbuten-(3)-al-(1).

What is claimed is:

1. Process for the preparation of 4-[2′,6′,6′-trimethylcyclohexen-(1′)-yl]-2-methylbuten-(3)-al-(1) which comprises:

(a) reacting β-ionone with an alkyl ester of chloroacetic acid, wherein the alkyl moiety is lower alkyl, at a temperature between −20° and 10° C., in the presence of a nucleophilic compound selected from the group consisting of an alkali metal alcoholate, an alkaline earth metal alcoholate, each of said alcoholates having from 1 to 6 carbon atoms, amalgamated magnesium, an alkali metal amide and an alkali metal hydride, to form a condensation product of said β-ionone and said alkyl ester of chloroacetic acid;

(b) adding an alkali hydroxide in situ while maintaining the temperature between −10° and 20° C., whereby saponification of said condensation product is effected;

(c) treating the resulting product in situ with a lower aliphatic fatty acid while maintaining the temperature between −30° and 20° C.; and (d) adding to the reaction mixture a member selected from the group consisting of water and a dilute acid while maintaining the mixture between 0° and 30° C.

2. Process for the preparation of 4-[2′,6′,6′-trimethylcyclohexen-(1′)-yl]-methylbuten-(3)-al-(1) which comprises:

(a) reacting β-ionone with an alkyl ester of chloroacetic acid, wherein the alkyl moiety is a lower alkyl of from 1 to 6 carbon atoms, at a temperature between −20° and 10° C., in the presence of a nucleophilic compound selected from the group consisting of an alkali metal alcoholate, an alkaline earth metal alcoholate, each of said alcoholates having from 1 to 6 carbon atoms, amalgamated magnesium, an alkali metal amide and an alkali metal hydride to form a condensation product of said β-ionone and said alkyl ester of chloroacetic acid;

(b) adding an alkali metal hydroxide incorporated in a lower aliphatic alcohol solution in situ while maintaining the temperature between −10° and 20° C. to effect saponification of said condensation product;

(c) treating the resulting product in situ with an excess of a substatially anhydrous acid selected from the group consisting of lower aliphatic fatty acids of from 1 to 6 carbon atoms while maintaining the temperature between −30° and 20° C.; and (d) sequentially adding to the reaction mixture a member selected from the group consisting of water, dicarboxylic acids, mono- and dihydroxydicarboxylic acids of from 1 to 6 carbon atoms, inorganic phosphoric acids and inorganic sulfuric acids, said acids being in dilute aqueous solutions, while maintaining the mixture between 0° and 30° C.

3. Process for the preparation of 4-[2′,6′,6′-trimethylcyclohexen-(1′)-yl]-2-methylbuten-(3)-al-(1) which comprises:

(a) reacting β-ionone with an alkyl ester of chloroacetic acid, wherein the alkyl moiety is a lower alkyl of from 1 to 6 carbon atoms, in a mol ratio of 1:1.1–1.5 and at a temperature of between 10° and 0° C. in the presence of an inert organic diluent and 1.2 to 1.7 mols of a nucleophilic compound selected from the group consisting of an alkali metal alcoholate, an alkaline earth metal alcoholate, each of said alcoholates having from 1 to 6 carbon atoms, amalgamated magnesium, an alkali metal amide and an alkali metal hydride, to form a condensation product of said β-ionone and said alkyl ester of chloroacetic acid;
(b) adding in situ an alkali metal hydroxide incorporated in a solution of a lower aliphatic alcohol of from 1 to 4 carbon atoms, said hydroxide being added in a mol ratio of 1.2 to 2 mols per mol of β-ionone, while maintaining the temperature between −10° and 20° to effect saponification of said condensation product;
(c) treating the resulting product in situ with an excess of a substantially anhydrous acid selected from the group consisting of lower aliphatic fatty acids of from 1 to 6 carbon atoms while maintaining the temperature between −30° and 20° C.; and
(d) sequentially adding to the reaction mixture 0.5 to 1.0 liters per mol of β-ionone initially introduced of a member selected from the group consisting of water, dicarboxylic acids, mono- and dihydroxydicarboxylic acids of from 1 to 6 carbon atoms, inorganic phosphoric acids and inorganic sulfuric acids, said acids being in dilute aqueous solution, while maintaining the mixture between 0° and 30° C.

4. Process as claimed in claim 3 wherein the said β-ionone and said alkyl ester of chloroacetic acid are reacted initially in the presence of sodium methylate.

5. Process as claimed in claim 3 wherein said alkyl ester of chloroacetic acid is chloroacetic acid ethyl ester.

6. Process as claimed in claim 3 wherein said alkyl ester of chloroacetic acid is chloroacetic acid methyl ester.

7. Process as claimed in claim 3 wherein the alkali metal hydroxide is sodium hydroxide.

8. Process as claimed in claim 3 wherein the alkali metal hydroxide is potassium hydroxide.

9. Process as claimed in claim 3 wherein the substantially anhydrous fatty acid is acetic acid.

10. Process as claimed in claim 3 wherein aqueous tartaric acid is added in the last step.

References Cited by the Examiner
UNITED STATES PATENTS 2,987,550   6/1961   Stieg et al. _____ 260—598
3,031,507   4/1962   Ortoli et al. _____ 260—598

OTHER REFERENCES

Chemisches Zentralblatt, 1937, II, p. 3452.

References Cited by the Applicant

I. M. Heilbron, J. Chem. Soc., 1942, 727.

LEON ZITVER, *Primary Examiner.*

J. J. SETELIK, B. HELFIN, *Assistant Examiners.*